United States Patent
Nakasuji et al.

(10) Patent No.: US 8,432,460 B2
(45) Date of Patent: Apr. 30, 2013

(54) FLICKER DETECTION DEVICE, FLICKER ELIMINATION DEVICE, IMAGE PICKUP DEVICE, AND FLICKER DETECTION METHOD

(75) Inventors: Motohiro Nakasuji, Kanagawa (JP); Kazuhiro Sugeno, Kanagawa (JP)

(73) Assignee: Sony Corporation, Tokyo (JP)

( * ) Notice: Subject to any disclaimer, the term of this patent is extended or adjusted under 35 U.S.C. 154(b) by 1387 days.

(21) Appl. No.: 11/511,342

(22) Filed: Aug. 29, 2006

(65) Prior Publication Data

US 2007/0046790 A1 Mar. 1, 2007

(30) Foreign Application Priority Data

Aug. 30, 2005 (JP) ............................... P2005-250313

(51) Int. Cl.
*H04N 9/73* (2006.01)
*H04N 5/228* (2006.01)
*H04N 5/217* (2011.01)

(52) U.S. Cl.
USPC .................. 348/226.1; 348/222.1; 348/228.1; 348/241

(58) Field of Classification Search ............. 348/207.99, 348/220.1, 222.1, 223.1, 226.1, 228.1, 231.3, 348/231.6, 234, 235, 236, 237, 238, 241, 348/250, 251, 254
See application file for complete search history.

(56) References Cited

U.S. PATENT DOCUMENTS

| 5,585,942 A * | 12/1996 | Kondo .......................... 358/474 |
| 6,710,818 B1 * | 3/2004 | Kasahara et al. ............. 348/607 |
| 2004/0165084 A1 * | 8/2004 | Yamamoto et al. ........ 348/226.1 |
| 2006/0055823 A1 | 3/2006 | Kinoshita et al. |

FOREIGN PATENT DOCUMENTS

| JP | 9-130806 | 5/1997 |
| JP | 2001-119708 | 4/2001 |
| JP | 2004-222228 | 8/2004 |

OTHER PUBLICATIONS

Office Action issued Aug. 10, 2010 in Japan Patent Application No. 2005-250313.

* cited by examiner

*Primary Examiner* — Chieh M Fan
*Assistant Examiner* — Peter Chon
(74) *Attorney, Agent, or Firm* — Oblon, Spivak, McClelland, Maier & Neustadt, L.L.P.

(57) ABSTRACT

A flicker detection device includes an accumulation section that divides a screen into a plurality of areas to perform accumulation of pixel levels, writing and reading of the accumulation result to and from a memory area allocated to every area, thereby accumulating the pixel levels in the area for every area, an accumulation result memory that stores the accumulation results of the accumulation section, an area discrimination section that discriminates whether or not every area is a still image area using the accumulation result obtained by the accumulation section and the accumulation result stored in the accumulation result memory, and a flicker level calculation section that averages the accumulation results of the areas discriminated as the still image area by the area discrimination section, and performs an operation using the averaged accumulation result and the accumulation result obtained by the accumulation section, thereby calculating a flicker level.

20 Claims, 7 Drawing Sheets

CONFIGURATION OF FLICKER DETECTION SECTION

CONFIGURATION OF IMAGE PICKUP DEVICE

CONFIGURATION OF FLICKER DETECTION SECTION

DISCRIMINATION OPERATIONS FOR EVERY PIXEL AND FOR EVERY AREA

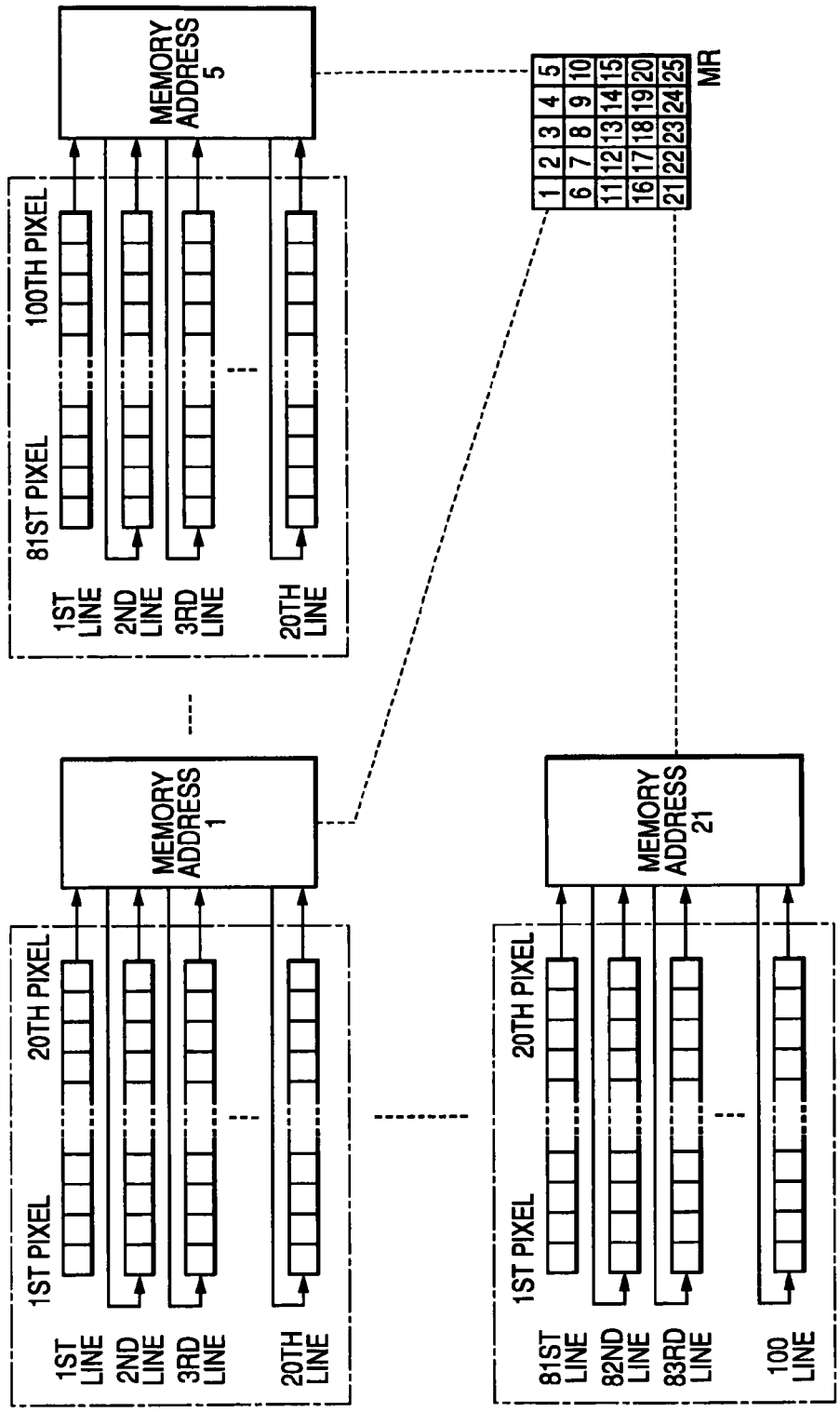

OPERATION OF AREA DISCRIMINATION SECTION

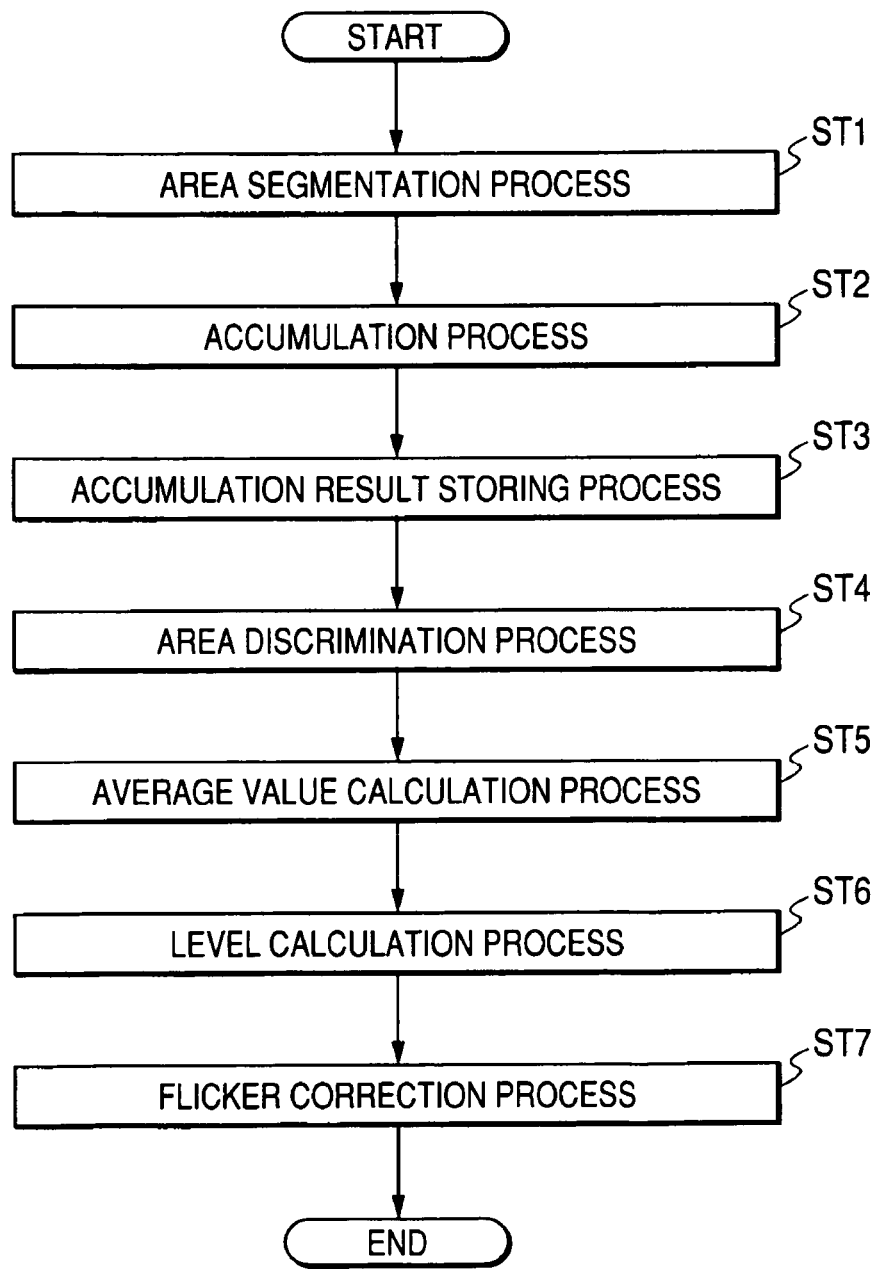

CHARGE STORAGE AMOUNT IN IMAGE SENSOR USING GLOBAL SHUTTER METHOD

FACE FLICKER

FIG. 9
BRIGHTNESS ACCUMULATION RESULT AND FLICKER LEVEL
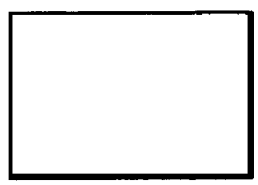 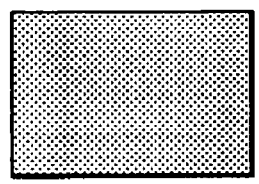 
YI = 100   YI = 80    YI = 90
FL = 10    FL = -10   FL = 0
FIG. 10
CASE INCLUDING MOVING OBJECT
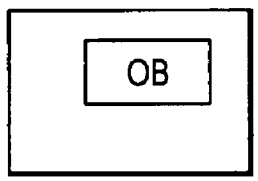 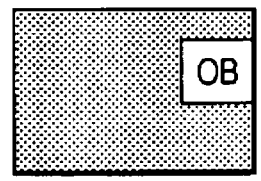 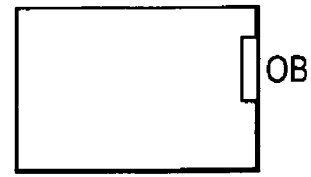
YI = 100   YI = 85    YI = 91
FL = 8     FL = -7    FL = -1

FLICKER DETECTION DEVICE, FLICKER ELIMINATION DEVICE, IMAGE PICKUP DEVICE, AND FLICKER DETECTION METHOD

CROSS REFERENCES TO RELATED APPLICATIONS

The present invention contains subject matter related to Japanese Patent Application JP 2005-250313 filed in the Japan Patent Office on Aug. 30, 2005, the entire contents of which being incorporated herein by reference.

BACKGROUND OF THE INVENTION

1. Technical Field

The present invention relates to a flicker detection device, a flicker elimination device, an image pickup device, and a flicker detection method. In detail, a screen is divided into a plurality of areas, addition of pixel levels and writing and reading of the result of the addition to a memory area allocated to each area are performed, the pixel levels in the area are accumulated for every area, and whether or not the area is a still image area is discriminated for every area using the result of the accumulation and an accumulation result of the same area which has already been stored in an accumulation result memory. Further, the accumulation results of the areas discriminated as still image areas are averaged, and a flicker level is calculated for every screen based on the averaged accumulation result and the accumulation results obtained by accumulating the pixel level in each of the areas for every area, thereby removing flickers.

2. Related Art

In the case in which image pickup is performed under a light source periodically turning on and off such as a fluorescent light, there are caused periodical bright and dark fringes on the pickup image or periodical differences in brightness of whole image between the frames. These are called flickers, and considered to be an inevitable problem under the blinking light source for image pickup devices equipped with image sensors accumulating charges to generate video signals.

In an image sensor, there can be different charge accumulation timings for every plane or for every line, and a method of synchronizing the charge accumulation timings for every plane is called a global shutter method while a method of synchronizing the charge accumulation timings for every line is called a rolling shutter method.

In the global shutter method, if the image pickup rate is higher than the blinking frequency of the light source, the amount of charge accumulated in a frame period varies between the frames, which may cause a flicker.

FIG. 7 is a diagram for explaining the charge accumulation amount in the image sensor adopting the global shutter method. In the case in which the illumination intensity IL periodically varies as shown in FIG. 7 in accordance with the frequency of the commercial power supply voltage, the difference in phase between the periodical illumination intensity and the exposure period causes the area difference between the hatched areas with a constant exposure period TC. The area of the hatched area corresponds to the charge accumulation amount, and accordingly, the difference in the areas, namely the difference in the charge accumulation amount, causes the difference in brightness between the frames. Therefore, as shown in FIG. 8, the frames with different phases from the illumination intensity IL form a video image with a brightness difference between the frames, and periodical differences in brightness of whole image between the frames appear. It should be noted that in FIG. 8 shows the case in which three frame periods correspond to one cycle of the illumination intensity variation.

A flicker component included in the video image shot under the periodically blinking light source can be approximated by a sine wave, and a method of removing the flicker utilizing the characteristics of the sine wave to form a correction image is adopted. Further, a method of detecting the flicker component from the input image and controlling the gain based on the detected flicker component in order for correcting the flicker has been proposed (see, for example, JP-A-2004-222228).

SUMMARY

Incidentally, the phase and the amplitude of a face flicker can be obtained by performing brightness integration of the whole screen for each of the screens and then comparing the results of the integration with each other using a plurality of screens corresponding to the period of the screens having the same phase relations to the illumination intensity variation, namely using the screens with different phases with respect to the periodic variation of the illumination intensity.

For example, if the period of the illumination variation, namely the flicker period corresponds to three frame periods, the brightness integration of the whole screen is performed on the three frames of screens with different phase relations to the illumination variation from each other. It is assumed here that the result of the brightness accumulation of the first frame is "YI=100," the result of the brightness accumulation of the second frame is "YI=80," and the result of the brightness accumulation of the third frame is "YI=90," as shown in FIG. 9. In this case, since the average of three frames is "90," the flicker component of the first frame becomes "FL=10," the flicker component of the second frame becomes "FL=−10," and the flicker component of the third frame becomes "FL=0".

However, if a moving object is included in the screen of the pickup image, the result of the brightness accumulation is varied, and accordingly, the accumulation result does not correctly represent the flicker component.

It is assumed that, for example as shown in FIG. 10, the moving object OB is included in the pickup image shown in FIG. 9, the accumulation result of the first frame is "YI=100" with the brightness of the moving object equal to the brightness of the screen, the accumulation result of the second frame including a half of the moving object OB is "YI=85," and the accumulation result of the third frame including only a little part of the moving object OB is "TI=91". In this case, since the average of the three frames is "YIavg=92," the flicker component of the first frame becomes "FL=8," the flicker component of the second frame becomes "FL=−7," and the flicker component of the third frame becomes "FL=−1," and accordingly, the flicker components become different from the case shown in FIG. 9.

Therefore, according to an embodiment of the invention, there are provided a flicker detection device, a flicker elimination device, an image pickup device, and a flicker detection method capable of easily detecting the flicker level with a simple configuration and also removing the flicker.

According to a flicker detection device, a flicker elimination device, an image pickup device, and a flicker detection method of an embodiment of the invention, a screen is divided into a plurality of areas, accumulation of pixel levels, writing and reading of the accumulation result to and from a memory area allocated to every area are performed, thereby accumulating the pixel levels in the area for every area, and the obtained accumulation result is stored in an accumulation result memory. In this case, in accumulating the pixel levels, in each of the areas, the pixel levels are sequentially accumulated in a line direction, the accumulation result is written in the memory area allocated to every area in response to termination of the accumulation in the line direction, and in accumulating the pixel levels in the line direction on the subsequent line, the accumulation result from the memory area is read out and the pixel levels are sequentially added to the accumulation result thus read out, and the accumulation result is written back in the memory area allocated to every area in response to termination of the accumulation in the line direction, thereby obtaining the accumulation result. Further, discrimination whether or not every area is a still image area is performed using the accumulation result obtained by accumulating the pixel levels in the area for every area and the stored accumulation result. The accumulation results of the areas discriminated as the still image area are averaged. For example, the accumulation results of the areas discriminated as the still image area in the screens having different phases with respect to the illumination intensity variation from each other are averaged. By performing an operation using the averaged accumulation result and the accumulation result obtained by accumulating the pixel levels in the area for every area, the flicker level can be calculated.

According to an embodiment of the invention, the accumulation of the pixel levels and writing and reading of the accumulation result to or form the memory area allocated to every area are performed, an operation is performed using the accumulation result obtained by accumulating the pixel levels in the area for every area and the average value of the accumulation results of the areas discriminated as the still image area, thereby calculating the flicker level. Therefore, the flicker level can easily be detected even if a moving object is included. Further, since the accumulation result is calculated by repeating the writing and reading of the accumulation result to and from the memory area allocated to every area in obtaining the accumulation result, the accumulation result can efficiently obtained without requiring large capacity memory. Therefore, the configuration can be simplified, and accordingly, the cost can be reduced.

BRIEF DESCRIPTION OF THE DRAWINGS

The invention will now be described with reference to the accompanying drawings, wherein like numbers refer to like elements.

FIG. 4 is a diagram for explaining the operation of an accumulation section.

FIG. 6 is a flowchart showing a flicker detection elimination operation.

FIG. 9 is a diagram showing brightness accumulation results and flicker levels.

FIG. 10 is a diagram showing the case in which a moving object is included.

DESCRIPTION OF THE EMBODIMENTS

Figure 1:
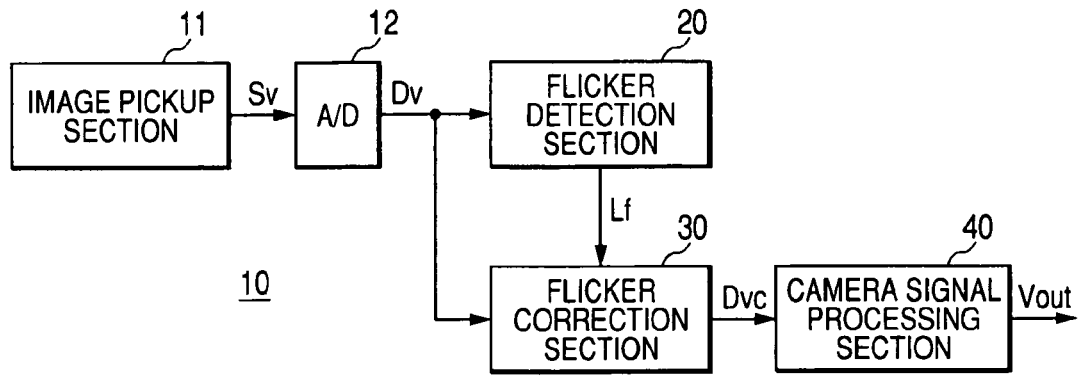
FIG. 1 is a block diagram showing a configuration of an image pickup device.

Hereinafter, embodiments of the present invention will be described with reference to the accompanying drawings. FIG. 1 shows the configuration of an image pickup device.

An image pickup section 11 of an image pickup device 10 generates video signal Sv and supplies it to an A/D conversion section 12. The A/D conversion section 12 converts the video signal Sv supplied from the image pickup section 11 into a digital video signal Dv, and supplies it to a flicker detection section 20 and a flicker correction section 30. The flicker detection section 20 detects the flicker level, and supplies a flicker level signal Lf representing the detection result to the flicker correction section 30.

Figure 2:
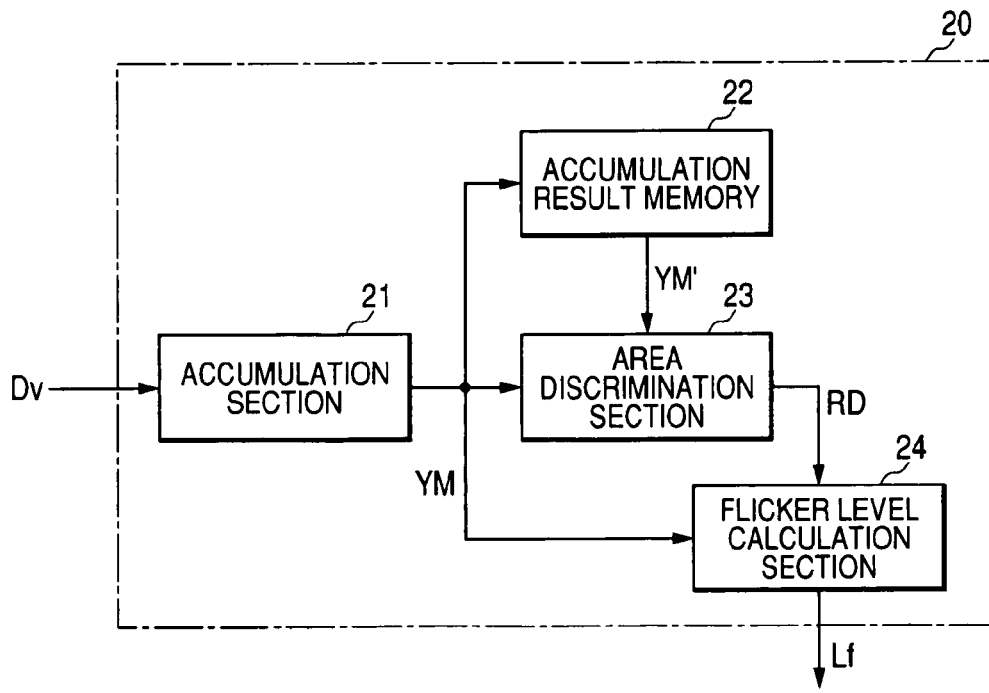
FIG. 2 is a block diagram showing a configuration of a flicker detection section.

FIG. 2 shows the configuration of the flicker detection section. An accumulation section 21 of the flicker detection section 20 divides the screen into a plurality of areas, and calculates accumulation of the pixel levels for every area, namely the brightness levels of the areas. Further, the accumulation section 21 supplies the accumulation result memory 22, an area discrimination section 23, and a flicker level calculation section 24 with the accumulation results YM.

The accumulation result memory 22 stores the accumulation results YM supplied therefrom. Further, the area discrimination section 23 is supplied with an accumulation result YM' which has already been calculated using the video signal Dv of the frame having the same phase with respect to the periodic illumination intensity variation as that of the frame, from which the accumulation results YM supplied from the accumulation section 21 to the area discrimination section 23 are obtained.

It should be noted here that, assuming the ratio of the frequency of the illumination intensity variation to the frame frequency is "Ka:Kb," and the least common multiple of "Ka" and "Kb" is "Klcm," the period of the frame images having the same phases with respect to the illumination intensity variation can be obtained as a period corresponding to "Klcm" frames. Therefore, if the frame frequency is higher than the frequency of the illumination intensity variation, namely the flicker frequency, the accumulation result YM' corresponding to the accumulation results YM can be supplied to the area discrimination section 23 by memorizing the accumulation results of "Klcm" frames. It should be noted that the frame frequency is obvious from the operation of the image pickup section 11, and the flicker frequency is assumed to be set with a user interface (not shown) provided to the image pickup device 10. Further, it is also possible to detect periodicity of the brightness variation in the frame image to calculate the flicker frequency.

The area discrimination section 23 calculates the difference between the accumulation result YM supplied from the accumulation section 21 and the accumulation result YM' supplied from the accumulation result memory 22 for every area in the same position, and discriminates that the area is a moving image area if the difference value exceeds a threshold value, or a still image area if it does not exceed the threshold value. Further, it supplies a flicker level calculation section 24 with a discrimination signal RD representing the discrimination result.

The flicker level calculation section 24 then generates a flicker level signal Lf representing the flicker level of every flame using the discrimination signal RD and the accumulation result YM, and supplies them to the flicker correction section 30. In generating the flicker level signal Lf, the accumulation results of the areas denoted as the still image areas with the discrimination signal RD are averaged. In the averaging process, the average value of the accumulation results of the frame images having different phases with respect to the periodical illumination intensity variation from each other. Further, the flicker level signal Lf is generated based on the difference between the average value thus calculated and the accumulation result of each frame.

The flicker correction section 30 performs correction of the video signal Dv in accordance with the flicker signal Lf so as to eliminate the flicker component, and supplies a camera signal processing section 40 with the video signal Dvc processed with the flicker correction.

The camera signal processing section 40 performs various signal processing such as a gamma correction or a knee correction on the video signal Dvc processed with the flicker correction to generate video output signal Vout.

The flicker detection elimination operation will now be explained. As described above, the accumulation section 21 divides the screen into a plurality of areas to obtain the brightness accumulation result for every area. Hereinafter, for the sake of simplicity of explanation, it is assumed that the size of the screen is 100 pixels in the vertical direction and 100 pixels in the horizontal direction, the pixel of the video signal Dv is composed of 10 bits, and the screen is divided equally into five blocks in each of vertical and horizontal directions.

If the screen is divided into a plurality of areas to perform discrimination of whether or not each of the areas is a still image area, the capacity of the memory used therefor can be reduced compared to the case of discriminating whether or not each of the pixels is in a still image area.

Figure 3A:
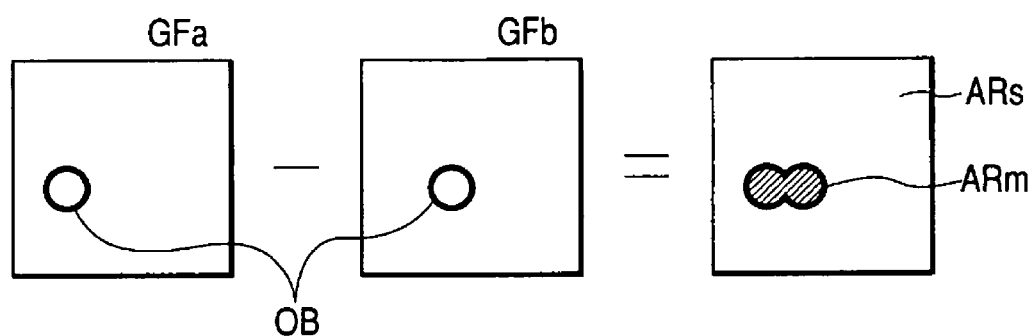
FIGS. 3A and 3B are diagrams for explaining discrimination operations for every pixel and for every area, respectively.

For example, in the case in which whether or not each of the pixels is in the still image area is discriminated on the frame image including the moving object OB, assuming that the previous frame image GFa is stored, the difference in the pixel level between the frame image GFa and the input frame image GFb is detected in every pixel as shown in FIG. 3A. The pixel section ARm (denoted with hatching) in which the difference in the pixel level exceeds the threshold value is discriminated as the moving image area, and the other pixel section ARs in which it does not exceed the threshold is discriminated as the still image area. As described above, in the case of discriminating whether or not each of the pixel is in the still image area, the memory capacity of "100 pixel×100 pixel×10 bits = 100,000 bits" is necessary for storing the frame image GFa.

Figure 3B:
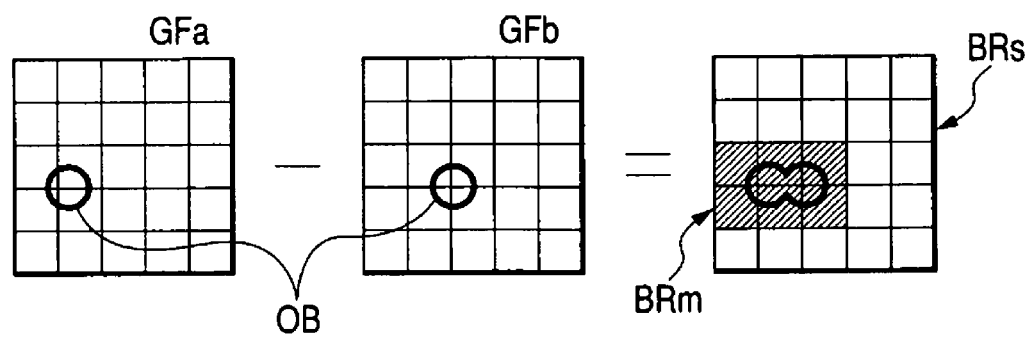

Further, in the case of discriminating whether or not each area including a plurality of pixels is the still image area on the frame image including the moving object OB, as shown in FIG. 3B, in storing the previous frame image GFa, the frame image GFa is divided equally into five blocks in each of vertical and horizontal directions to store in the memory the accumulation result of every area. Further, the difference between the accumulation result stored for every area and the accumulation result of the area in the corresponding position in the input frame image GFb is detected. The area section BRm (denoted with hatching) in which the difference in the accumulation results exceeds the threshold value is discriminated as the moving image area, and the other area section BRs in which it does not exceed the threshold is discriminated as the still image area. In this case, since each of the areas can be described with "10 bits×400 pixels=21 bits," the memory capacity of "5 blocks×5 blocks×21 bits=525" becomes necessary in total for storing the accumulation results of the whole areas of the frame image GFa.

Therefore, by performing the discrimination of whether or not every area is the still image area, the memory capacity necessary therefor can substantially be reduced compared to the case of discriminating whether or not every pixel is in the still image area.

It should be noted here that in the case of discriminating whether or not every area is the still image area, the area section BRs discriminated as the still image area does not include the image of the moving object OB, and the area section BRm discriminated as the moving image area includes both the moving object OB and a still image.

Further, since the face flicker is caused by the difference between the charge accumulation period (exposure period) for one frame and the blinking period of the light source, the variation of pixel level is caused by the flicker in a constant ratio throughout the pixels in the same frame. Accordingly, if the level variation caused by other factors than the flicker, the flicker level can be detected from only a partial sample in a frame.

Therefore, since it can be said that the still image area, which does not include the image of the moving object, is in the condition in which no other level variation than the flicker is included, the flicker level can be detected in the case of discriminating whether or not every area is the still image area with substantially the same accuracy as in the case of discriminating whether or not each pixel is in the still image area.

The operation of the accumulation section 21 will now be explained. In the case in which the screen is divided into a plurality of areas to calculate the accumulation result for every area, the accumulation section 21 efficiently calculates the accumulation results with a few memory capacity by repeatedly using the memory area as described below.

Since the horizontal size of one area is, for example, 20 pixels, as shown in FIG. 4, the accumulation result obtained by accumulating the pixel levels of the first 20 pixels, namely the first through 20th pixels in the first line is written in the memory address 1 of the memory MR. The accumulation result obtained by accumulating the pixel levels of subsequent 20 pixels, namely 21st through 40th pixels in the first line is stored in the memory address 2. Similarly as above, the accumulation result of the 20 pixels to the last of the first line, namely the accumulation result obtained by accumulating 81st through 100th pixels in the first line is stored in the memory address 5.

In the second line, the accumulation result stored in the memory address 1 is read out, the pixel levels of the first through 20th pixels are added to the accumulation result thus read out, and the accumulation result thus obtained is written back in the memory address 1. Subsequently, the accumulation result stored in the memory address 2 is read out, the pixel levels of the 21st through 40th pixels are added to the accumulation result thus read out, and the accumulation result thus obtained is written back in the memory address 2. Similarly as above, the process of reading out the stored accumulation result from the memory, and writing it back in the memory after adding the pixel levels in the second line to the accumulation result thus read out is performed.

Since the vertical size of one area is, for example, 20 lines, by repeating the similar process to the process of the second line up to the 20th line, the accumulation results in the areas of the first column can be stored in the memory address 1 through the memory address 5.

Similarly, regarding the areas in the second column, the accumulation results in the areas in the second column can be stored in the memory address 6 through the memory address 10 by similarly processing to the areas in the first column using the memory address 6 through the memory address 10.

Regarding the third through fifth columns, the accumulation results in the areas in the third through fifth columns can be stored in the memory address 11 through the memory address 25 by repeating the similar process using the memory address 11 through the memory address 25.

As described above, by assigning one memory address to each of the areas obtained by dividing the screen and storing the accumulation result in the memory address, the required memory capacity can be reduced compared to the case of storing the pixel level of each of the pixels is stored in the memory. Further, since the reading and writing processes are performed once for 20 pixels, there is no need for using high frequency.

The accumulation results YM thus generated are supplied to the accumulation result memory 22, an area discrimination section 23, and a flicker level calculation section 24. It should be noted that the accumulation section 21 can be arranged to calculate the accumulation results using the accumulation result memory 22. In this case, the condition in which the accumulation results YM are stored in the accumulation result memory 22 is realized at the time point when the calculation of the accumulation results is completed.

Figure 5A:
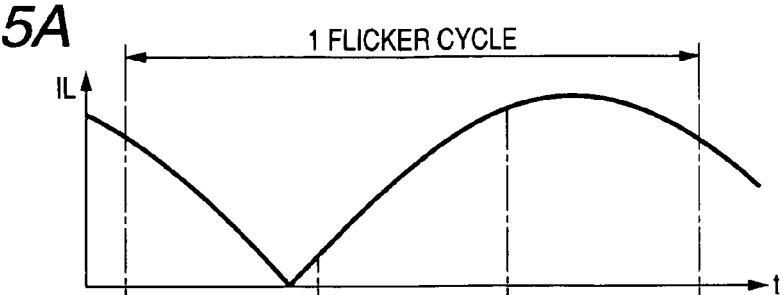
FIGS. 5A through 5D are diagrams for explaining the operation of an area discrimination section.
Figure 5B:
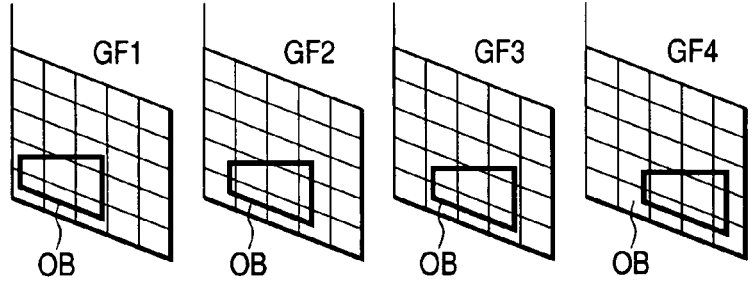

The discrimination operation of the area discrimination section will now be explained with reference to FIGS. 5A to 5D. In the discrimination operation of whether or not it is the still image area, two frame images having the same phases shown in FIG. 5B with respect to the variation of the illumination intensity IL shown in FIG. 5A are used. For example, the accumulation result YM' of the frame image GF1 of the first frame stored in the accumulation result memory 22 and the accumulation result YM of the frame image GF4 of the fourth frame calculated by the accumulation section 21 are used.

As described above, in the two frame images having the same phase with respect to the illumination intensity variation, the flicker components become the same if there is no level variation caused by other factors than the flicker. Therefore, if the accumulation results of the two frames are compared to each other in the areas in the same positions, the difference therebetween becomes small with no level variation caused by other factors than the flicker, and the difference therebetween becomes large with level variation caused by other factors than the flicker.

Figure 5C:
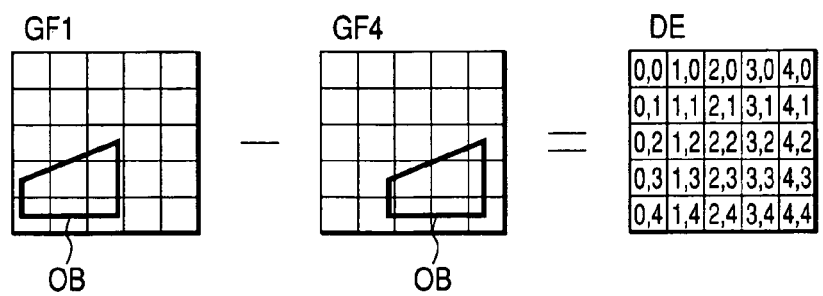
Figure 5D:
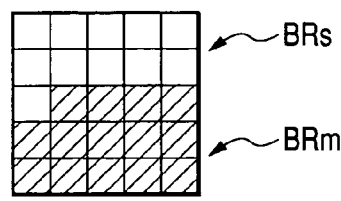
Figure 7:
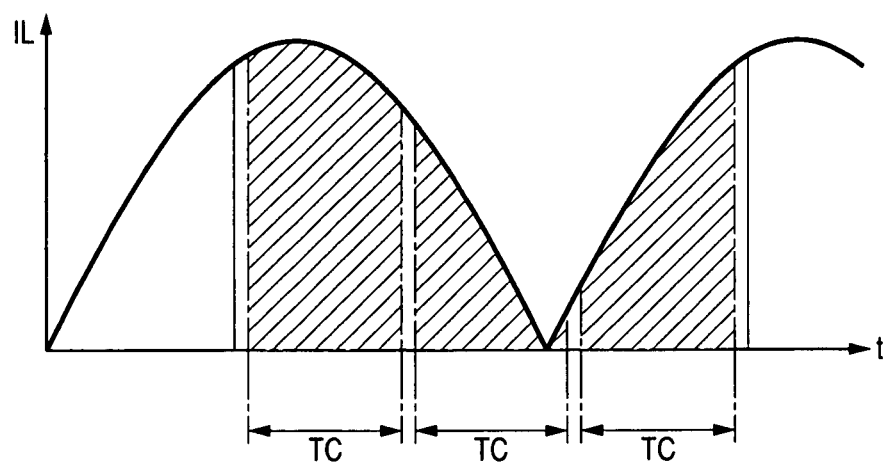
FIG. 7 is a diagram for explaining the charge accumulation amount in the image sensor adopting the global shutter method.
Figure 8:
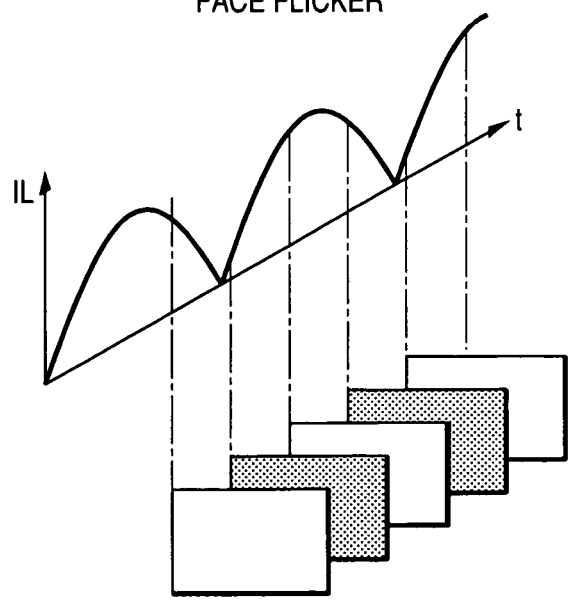
FIG. 8 is a diagram for explaining the face flicker.

Therefore, as shown in FIG. 5C, the difference DE (0,0) through DE (4,4) of the accumulation results is obtained for every area in the corresponding positions of the two frame images GF1 and GF4 having the same phases with respect to the variation in the illumination intensity, and each of the differences DE (0,0) through DE (4,4) is compared with the threshold value. It should be noted here that the difference in the area not including the moving object OB becomes small while the difference in the area including the moving object OB becomes large. Therefore, as shown in FIG. 5D, the area with the difference exceeding the threshold value, namely the area including the moving object OB, is discriminated as the moving image area (denoted with hatching) BRm. Further, the area with the difference not exceeding the threshold value, namely the area not including the moving object OB is discriminated as the still image area (area without hatching) BRs. The discrimination operation of whether or not it is the still image area is thus performed, the discrimination signal RD representing the discrimination result is generated and then supplied to the flicker level calculation section 24.

Further, in FIGS. 5A through 5D, if the moving object is small, in the discrimination by obtaining the difference in the accumulation result between the two frame images GF1 and GF4, the area through which the moving object has passed is discriminated as the still image area. However, this area is the moving image area including the moving object in the frame image GF2 or the frame image GF3. Therefore, the discrimination of whether or not it is the still image area is performed for every frame image having a different phase with respect to the illumination intensity variation. For example, by performing the discrimination using the frame images GF2 and GF5 (not shown), or the discrimination using the frame images GF3 and GF6 (not shown), the still image area can correctly be discriminated. Alternatively, it is possible that the motion vector of the object is obtained using the frame images GF1 and GF4, and the area through which the object has passed between the frame images GF1 and GF4 from the motion vector, thereby judging the area as the motion area. Further, assuming that the area discriminated as the moving image area in the frame image GF1 moves to the area discriminated as the moving image area in the frame image GF4, if the area positioned between the area discriminated as the moving image area in the frame image GF1 and the area discriminated as the moving image area in the frame image GF4 is processed as the moving image area, the discrimination can easily be performed.

The flicker level calculation section 24 then generates a flicker level signal Lf representing the flicker level of every flame using the discrimination signal RD and the accumulation result YM. The flicker level calculation section 24 calculates the average value averaging the brightness variation between the frames.

In the calculation of the average value, the frame images having different phases with respect to the periodical illumination intensity variation from each other so as to accurately calculate the average value. For example, the frame images GF2 through GF4 are used. As described above, by using the same numbers of frame images with different phases with respect to the periodical illumination intensity variation from each other, it can be prevented that the average value is calculated using only bright frame images or the average value is calculated using only dark frame images.

Further, in each of the frame images, the accumulation results of the areas discriminated as the area without the level variation caused by other factors than the flicker, namely the still image area is accumulated to calculate the average value. It should be noted here that an equal number of accumulation results are used in each of the frame images so that the average value can easily be calculated. Further, by using the accumulation results of the areas in the positions discriminated as the still image area in every frame image, it is guaranteed that an equal number of accumulation results are used from every frame image.

As described above, by performing accumulation using an equal number of accumulation results from every frame images, and dividing by the number of frames, the average value averaging the brightness variation between the frames caused by the flicker can easily be calculated.

Subsequently, the flicker level of every frame image is calculated using the average value thus calculated and the accumulation result of every frame image. In this case, while calculating the average value using an equal number of accumulation results from every frame image, the accumulation results used for calculating the average value are accumulated for every frame, and the difference between this accumulation value and the calculated average value is calculated for every frame. This difference corresponds to an accumulation result of the flicker levels of the pixels in the areas from which the accumulation results used for calculating the average value are obtained. Therefore, by dividing the difference by the number of the pixels in the areas from which the accumulation results used for calculating the average value are obtained.

Further, since the pixel level variation is caused by the flicker in the constant rate through out the frame image, it is possible that the frame images having the different phases with respect to the illumination intensity variation from each other are used, one of the areas discriminated as the still image area is selected from every frame image, and the average value is calculated using the accumulation results of the selected areas. In this case, by calculating the difference between the calculated average value and the accumulation result used for calculating the average value for every frame, and dividing the difference by the number of the pixels in an area, the flicker level for one pixel can easily be calculated.

As described above, the flicker level for one pixel is calculated for every frame image, the flicker level signal Lf represents the flicker level for every pixel is generated and then supplied to the flicker correction section 30.

Based on the flicker level signal Lf detected by the flicker detection section 20, the flicker correction section 30 corrects the signal level of the video signal Dv for every pixel so as to eliminate the flicker to generate the video signal Dvc. It should be noted here that the flicker level represents the changed portion of the brightness with respect to the average value. Therefore, the signal level of the video signal Dv is corrected to be decreased for the flicker level if the brightness is higher than the average value, while the signal level of the video signal Dv is corrected to be increased for the flicker level if the brightness is lower than the average value, thus the video signal Dvc from which the flicker is eliminated can be generated.

As described above, by performing various processes by the camera signal processing section 40 on the video signal Dvc from which the flicker is eliminated, the video output signal Vout without the flicker can be obtained even in the case in which the light source causes blinking in a predetermined period.

Incidentally, the flicker level detection process and the flicker elimination process can also be performed by software. In this case, it is assumed that the program is previously stored in the memory, previously recorded in the recording medium and retrieved therefrom to the memory, or delivered through the network and then stored in the memory, and the central processing unit (CPU) reads the program stored in the memory to execute it.

FIG. 6 is a flowchart showing the flicker detection and elimination process. In the step ST1, the CPU performs an area segmentation process to divide each of the frame images into a plurality of areas.

In the step ST2, the CPU performs an accumulation process to accumulate the pixel levels in the area to obtain the accumulation result for every area.

In the step ST3, the CPU performs an accumulation result storing process to store the accumulation results obtained in the step ST2 in the memory.

In the step ST4, the CPU performs an area discrimination process. In the area discrimination process, the CPU calculates the difference of the accumulation result for every area using the accumulation results of the two frame images having the same phases with respect to the illumination intensity variation, namely the accumulation result obtained in the step ST2 and the accumulation result stored in the memory. If the difference does not exceeds a threshold value, the area is discriminated as the still image area, and if the difference exceeds the threshold value, the area is discriminated as the moving image area.

In the step ST5, the CPU performs an average value calculation process. In the calculation of the average value, the accumulation results of the areas discriminated as the still image area in the area discrimination process in the step ST3 are averaged to calculate the average value.

In the step ST6, the CPU performs level calculation process. In the level calculation process, the CPU performs an operation using the average value calculated in the step ST4 and the accumulation results of the areas discriminated as the still image area in the area discrimination process in the step ST3 to calculate flicker level for, for example, every pixel for every frame.

In the step ST7, the CPU performs a flicker correction process. In the flicker correction process, based on the flicker level calculated in the step ST5, the CPU corrects the signal level of the video signal so as to cancel the flicker level.

It should be noted that although in the above embodiment, the case in which the flicker is detected and then eliminated after the image of every frame is divided into a plurality of areas is explained, the face flicker caused in the image for every field can also be eliminated by performing the similar process to the above.

As described above, since one screen is divided into a plurality of areas, the pixel levels in the area is accumulated for every area, whether or not the area is the still image area is discriminated using the obtained accumulation result, and the flicker level is calculated using the accumulation results in the area discriminated as the still image area, the flicker level can correctly be detected even if the moving object is included in the screen. Further, since the signal level is corrected in accordance with the detected flicker level, the flicker can accurately be eliminated.

Further, since accumulation results can efficiently be obtained without using a large capacity memory by assigning one memory address to one area and repeating writing and reading of the accumulation value in performing accumulation of the pixel levels, the configuration can be simplified, thus reducing the cost.

It should be understood by those skilled in the art that various modifications, combinations, sub-combinations and alterations may occur depending on design requirements and other factors insofar as they are within the scope of the appended claims or the equivalents thereof.

What is claimed is:

1. A flicker detection device comprising:
an accumulation section that divides each image frame of successive image frames, captured via global shuttering, into a plurality of image areas to perform accumulation of pixel levels, respective pairs of non-successive image frames being captured in phase with respect to a frequency cycle of a periodic illumination causing flicker, the accumulation section writing and reading accumulation data to and from a memory area allocated to the plurality of image areas to accumulate pixel levels in the memory area as accumulation results;
an accumulation result memory that stores the accumulation results of the accumulation section;
an area discrimination section that discriminates whether or not each of the plurality of image areas is a still image area using an accumulation result obtained by the accumulation section associated with a first image frame of one of the pairs of non-successive image frames and a previous accumulation result stored in the accumulation result memory associated with a second image frame of said one of the pairs of non-successive image frames; and
a flicker level calculation section that calculates a flicker level by averaging accumulation results associated with image areas discriminated as still image areas by the area discrimination section to obtain an averaged accumulation result, and by performing an operation using the averaged accumulation result and the accumulation result obtained by the accumulation section associated with the first image frame of said one of the pairs of non-successive image frames.

2. The flicker detection device according to claim 1, wherein the accumulation section performs accumulation of pixel levels by sequentially accumulating pixel levels in a line direction, writing accumulation data in the memory area allocated to the plurality of image areas in response to termination of pixel accumulation in the line direction, reading accumulation data from the memory area and sequentially adding pixel levels of a subsequent line to the read accumulation data to accumulate pixel levels in the line direction of the subsequent line, and writing the accumulation data in the memory area in response to termination of the accumulation in the line direction regarding the subsequent line.

3. The flicker detection device according to claim 1, wherein the flicker level calculation section performs the averaging using accumulation results of image frames with different phases with respect to illumination intensity variation from each other.

4. The flicker detection device according to claim 1, wherein the plurality of image areas form a plurality of rectangular blocks of pixels that are arranged horizontally and vertically in the image frame.

5. The flicker detection device according to claim 1, wherein plural image frames are between each of said pairs of non-successive image frames.

6. The flicker detection device according to claim 1, wherein said flicker level calculation section calculates the flicker level based on a set of the successive image frames, the set of successive image frames excluding the second image frame of said pair of non-successive image frames and including the first image frame of said pair of non-successive image frames and all image frames between said first and second image frames.

7. The flicker detection device according to claim 1, wherein the accumulation result memory includes the memory area allocated to the plurality of image areas for accumulating the pixel levels as accumulation results.

8. The flicker detection device according to claim 1, wherein discrimination regarding whether or not each of the plurality of image areas is a still image area is based on a motion vector associated with the first and second image frames of said pair of non-successive image frames.

9. A flicker elimination device comprising:
a setting section that sets a frequency of a periodic illumination causing flicker;
an accumulation section that divides each image frame of successive images frames, captured via global shuttering, into a plurality of image areas to perform accumulation of pixel levels, respective pairs of non-successive image frames being captured in phase with respect to the frequency of the periodic illumination causing the flicker, the accumulation section writing and reading accumulation data to and from a memory area allocated to the plurality of image areas to accumulate pixel levels in the memory area as accumulation results;
an accumulation result memory that stores the accumulation results of the accumulation section;
an area discrimination section that discriminates whether or not each of the plurality of image areas is a still image area using an accumulation result obtained by the accumulation section associated with a first image frame of one of the pairs of non-successive image frames and a previous accumulation result stored in the accumulation result memory associated with a second image frame of said one of the pairs of non-successive image frames;
a flicker level calculation section that calculates a flicker level by averaging accumulation results of image areas discriminated as still image areas by the area discrimination section to obtain an averaged accumulation result, and by performing an operation using the averaged accumulation result and the accumulation result obtained by the accumulation section associated with the first image frame of said one of the pairs of non-successive image frames; and
a flicker correction section that corrects a pixel level in the first image frame of said one of the pairs of non-successive image frames using the calculated flicker level.

10. The flicker elimination device according to claim 9, wherein the plurality of image areas form a plurality of rectangular blocks of pixels that are arranged horizontally and vertically in the image frame.

11. The flicker elimination device according to claim 9, wherein plural image frames are between each of said pairs of non-successive image frames,
said flicker level calculation section calculates the flicker level based on a set of the successive image frames, the set of successive image frames excluding the second image frame of said pair of non-successive image frames and including the first image frame of said pair of non-successive image frames and all image frames between said first and second image frames, and
the accumulation result memory includes the memory area allocated to the plurality of image areas for accumulating the pixel levels as accumulation results.

12. The flicker elimination device according to claim 9, wherein discrimination regarding whether or not each of the plurality of image areas is a still image area is based on a motion vector associated with the first and second image frames of said pair of non-successive image frames.

13. An image pickup device comprising:
an image pickup section that generates a video signal of a pickup image;
a setting section that sets a frequency of a periodic illumination causing flicker on the video signal;
an accumulation section that divides each image frame of multiple successive image frames of the video signal, captured via global shuttering, into a plurality of image areas to perform accumulation of pixel levels, respective pairs of non-successive image frames being captured in phase with respect to the frequency of the periodic illumination causing the flicker, the accumulation section writing and reading accumulation data to and from a memory area allocated to the plurality of image areas to accumulate pixel levels in the memory area as accumulation results;
an accumulation result memory that stores the accumulation results of the accumulation section;
an area discrimination section that discriminates whether or not each of the plurality of image areas is a still image area using an accumulation result obtained by the accumulation section associated with a first image frame of one of the pairs of non-successive image frames and a previous accumulation result stored in the accumulation result memory associated with a second image frame of said one of the pairs of non-successive image frames;
a flicker level calculation section that calculates a flicker level by averaging the accumulation results of image areas image areas discriminated as still image areas by the area discrimination section to obtain an averaged accumulation result, and by performing an operation using the averaged accumulation result and the accumulation result obtained by the accumulation section associated with the first image frame of said one of the pairs of non-successive image frames; and a flicker correction section that corrects a pixel level in the first image frame of said one of the pairs of non-successive image frames using the calculated flicker level to eliminate a flicker component form the video signal generated in the image pickup section.

14. The image pickup device according to claim 13, wherein the plurality of image areas form a plurality of rectangular blocks of pixels that are arranged horizontally and vertically in the image frame.

15. The image pickup device according to claim 13, wherein plural image frames are between each of said pairs of non-successive image frames, said flicker level calculation section calculates the flicker level based on a set of the successive image frames, the set of successive image frames excluding the second image frame of said pair of non-successive image frames and including the first image frame of said pair of non-successive image frames and all image frames between said first and second image frames, and the accumulation result memory includes the memory area allocated to the plurality of image areas for accumulating the pixel levels as accumulation results.

16. The image pickup device according to claim 13, wherein discrimination regarding whether or not each of the plurality of image areas is a still image area is based on a motion vector associated with the first and second image frames of said pair of non-successive image frames.

17. A flicker detection method comprising the steps of:

dividing each image frame of successive captured image frames, captured via global shuttering, into a plurality of image areas, respective pairs of non-successive image frames being in phase with respect to a frequency cycle of a periodic illumination causing flicker;

accumulating pixel levels by adding the pixel levels and writing and reading accumulation data to and from a memory area allocated to the plurality of image areas to accumulate pixel levels in the memory area as accumulation results;

storing the accumulation results obtained in the accumulating step;

discriminating whether or not each of the plurality of image areas is a still image area using an accumulation result obtained in the accumulating step associated with a first image frame of one of the pairs of non-successive image frames and a previous accumulation result stored in the storing step associated with a second image frame of said pair of non-successive image frames;

averaging accumulation results of image areas discriminated as still image areas in the discriminating step to obtain an averaged accumulation result; and calculating a flicker level in the first image frame of said pair of non-successive image frames by performing an operation using the averaged accumulation result and the accumulation result obtained in the accumulating step associated with the first image frame of said pair of non-successive image frames.

18. The flicker detection method according to claim 17, wherein the plurality of image areas form a plurality of rectangular blocks of pixels that are arranged horizontally and vertically in the image frame.

19. The flicker detection method according to claim 17, wherein plural image frames are between each of said pairs of non-successive image frames, the calculating the flicker level step is based on a set of the successive image frames, the set of successive image frames excluding the second image frame of said pair of non-successive image frames and including the first image frame of said pair of non-successive image frames and all image frames between said first and second image frames, and the accumulation result memory includes the memory area allocated to the plurality of image areas for accumulating the pixel levels as accumulation results.

20. The flicker detection method according to claim 17, wherein discrimination regarding whether or not each of the plurality of image areas is a still image area is based on a motion vector associated with the first and second image frames of said pair of non-successive image frames.

* * * * *